United States Patent [19]
Fellows et al.

[11] Patent Number: 5,099,176
[45] Date of Patent: Mar. 24, 1992

[54] FLUORESCENT LAMP BALLAST OPERABLE FROM TWO DIFFERENT POWER SUPPLIES

[75] Inventors: Mark W. Fellows, Buffalo Grove; John R. Shannon, Greyslake, both of Ill.

[73] Assignee: North American Philips Corporation, New York, N.Y.

[21] Appl. No.: 505,811

[22] Filed: Apr. 6, 1990

[51] Int. Cl.⁵ ............................................. H05B 37/00
[52] U.S. Cl. ...................................... 315/86; 315/226; 315/DIG. 4; 315/209 R
[58] Field of Search .................... 315/86, 307, 209 R, 315/DIG. 4, DIG. 5, 226; 307/65, 66

[56] References Cited

U.S. PATENT DOCUMENTS

| | | | |
|---|---|---|---|
| 3,373,313 | 3/1968 | Prines | 315/86 |
| 3,611,021 | 10/1971 | Wallace | 315/307 |
| 3,869,639 | 3/1975 | Herzog . | |
| 4,158,792 | 6/1979 | Kuroi et al. . | |
| 4,362,971 | 12/1982 | Sloan | 315/86 |
| 4,694,194 | 9/1987 | Hansel | 307/65 |
| 4,727,291 | 2/1988 | Bavaro . | |
| 4,751,398 | 6/1988 | Ertz . | |
| 4,866,350 | 9/1989 | Counts | 315/226 |
| 4,952,849 | 8/1990 | Fellows | 315/307 |
| 5,003,230 | 3/1991 | Wong | 315/DIG. 4 |

FOREIGN PATENT DOCUMENTS 3214669 4/1982 Fed. Rep. of Germany .

Primary Examiner—Eugene R. Laroche
Assistant Examiner—A. Zarabian
Attorney, Agent, or Firm—Robert T. Mayer

[57] ABSTRACT

A fluorescent lamp control system operable from either an AC power supply of a first frequency or a power supply of a second frequency and which operates the lamp in a dimmed condition when the power supply is that of the second frequency.

6 Claims, 1 Drawing Sheet

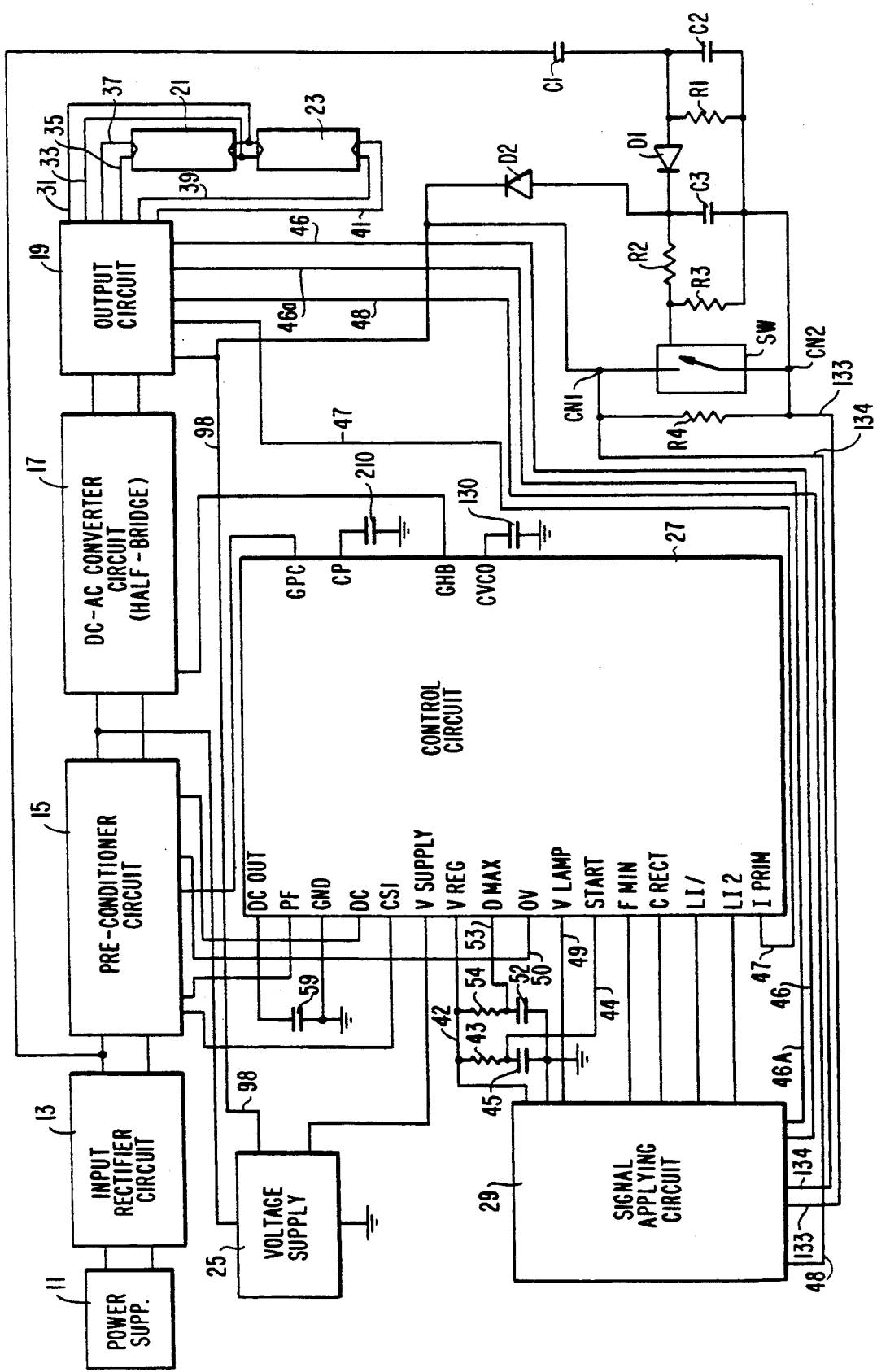

FLUORESCENT LAMP BALLAST OPERABLE FROM TWO DIFFERENT POWER SUPPLIES

This is an invention in the lighting art. More particularly, it involves an arrangement by which a fluorescent lamp may be operated from either an AC power supply or a DC power supply or from two AC power supplies with different frequencies.

This invention is related to that disclosed in U.S. Patent application Ser. No. 358,257 of John M. Wong and Michael A. Kurzak filed on May 26, 1989 under the title "Fluorescent Lamp Controllers with Dimming Control", now U.S. Pat. No. 5,003,230 and assigned to the same assignee as this application, now U.S. Pat. No. 5,003,230 and all matter incorporated by reference therein is hereby incorporated by reference herein.

This invention is also related to that disclosed in U.S. Patent application Ser. No. 403,222 of Stefan F. Szuba filed Sept. 5, 1989 under the title "Dimmer Control Circuit" and assigned to the same assignee as this application. That application and all matters incorporated by reference therein is also incorporated by reference herein.

In the past when it was desirable to operate a fluorescent lamp from both a normal AC power supply and an emergency power supply of a lower frequency than the normal supply, it was necessary to provide two ballasts, one for each power supply, and respective controls.

It is an object of this invention to provide a single such lamps from a normal AC power supply or an emergency power supply of a lower frequency than that of the normal supply.

One of the features of the invention is that it dims the light output of the fluorescent lamps it is controlling when the emergency power supply is turned on to replace the normal AC supply.

One of the advantages of the invention is that it provides increased life for batteries used as emergency DC power supplies over previous arrangements with emergency batteries.

In accordance with one aspect of the invention there is provided a control system for a fluorescent lamp including a single ballast means connected to the lamp. The single ballast means is connectable to either an AC power supply of a first frequency or a power supply of a second frequency. The fluorescent lamp is operated at substantially rated lumen condition when the AC power supply of said first frequency is applied to the single ballast means. When the power supply of the second frequency is applied to the single ballast means the fluorescent lamp is operated in a dimmed condition at less lumens than its rated condition.

In accordance with another aspect of the invention, there is provided a control system for a fluorescent lamp. The fluorescent lamp has a ballast means which is connected to the control system. The ballast means is connectable to an AC power supply of a first frequency or a power supply of a second frequency. The ballast means has two circuit nodes. The control system includes a resistor and a switch means in parallel with the resistor both being connected across the two circuit nodes of the ballast means. The switch means is connected across the two circuit nodes when the ballast means is connected to the AC power supply of the first frequency to provide a circuit in parallel with the resistor whereby the lamp is operated at substantially its rated lumens. The switch means is substantially open across the resistor when the ballast means is connected to the power supply of said second frequency whereby the ballast means when the latter condition prevails dims the light emanating from the fluorescent lamp so that it is operated substantially below its rated lumens.

Other objects, features and advantages of the invention will be apparent from the following description and appended claims when considered in conjunction with the accompanying drawing in which, the sole Figure shows a control system in accordance with the invention.

For the most part each of the elements shown in the Figure correspond to those disclosed in the aforementioned U.S. Patent application Ser. No. 358,257 except for the diodes D1 and D2, capacitors C1, C2 and C3, resistors R1, R2, R3 and R4 switch SW and power supply 11. However, the dimming interface circuit 110 of application Ser. No. 358,257 is not included in this system. It is to be understood, however, that otherwise the ballast means including the following elements of application Ser. No. 358,257 namely, input rectifier circuit 32, pre-conditioner circuit 28, DC-AC converter circuit 24, output circuit 20, lamps 11 and 12, voltage supply 40, control circuit 36 and signal applying circuit 112 correspond in all respects to input rectifier circuit 13, pre-conditioner circuit 15, DC-AC converter circuit 17, output circuit 19, lamps 21 and 23, voltage supply 25, control circuit 27, and signal applying circuit 29 of this application, respectively.

Power supply 11 represents an automatic transferring device which normally supplies an AC voltage of a prescribed voltage and frequency to input rectifier circuit 13. Upon the loss of the normal AC supply it supplies emergency power to circuit 13. Assume A.C.D.C. supply 11 is providing 120 volts, 60 cycle AC voltage to input rectifier circuit 13. Input rectifier circuit 13, rectifies the AC voltage it receives and provides a DC voltage to pre-conditioner circuit 15 with a waveshape that is the absolute value of the AC supply provided to input rectifier circuit 13. This DC waveform may be said to be a DC mirror image of the AC input rectifier circuit 13 receives.

Pre-conditioner circuit 15 is a boost converter which changes the DC waveform it receives to a constant DC at its output which is of a higher voltage than that circuit 15 receives. This constant DC output voltage is fed to DC-AC converter circuit 17. Converter circuit 17 converts the DC voltage it receives to a high frequency AC voltage. This high frequency AC voltage is provided to a tuned LC circuit residing in output circuit 19 (see FIG. 2 of the Mark W. Fellows et al U.S. Patent application Ser. No. 219,923, filed July 15, 1988, now U.S. Pat. No. 4,952,849 and assigned to the same assignee as this application) which illustrates the details of output circuit 19. By varying the frequency of the high frequency AC voltage applied from DC-AC converter circuit 17 to output circuit 19 the power provided to lamps 21 and 23 along lines 31, 33, 35, 37, 39 and 41 is varied.

As will be understood by those skilled in the art from the aforementioned Mark W. Fellows et al U.S. Patent application Ser. No. 219,923, filed July 15, 1988 voltage supply 25 of this application (which corresponds to voltage supply 40 of the Fellows et al application) provides a prescribed voltage to input "V SUPPLY" of control circuit 27. During start up operation this voltage is the result of a signal received by voltage supply 25 from pre-conditioner circuit 15. After start up a corresponding voltage is received at "V SUPPLY" from voltage supply 25 as a result of a signal along line 98 from output circuit 19. In response to the voltage supplied at the "V SUPPLY" input of control circuit 27, that circuit provides a signal on output terminal "V REG" which is used by the system as a regulating voltage.

The signal out of output "V REG" charges capacitor 45 through resistor 43 which produces a signal on input "START" of control circuit 27. This causes a frequency sweep to be produced by output circuit 19. Such a frequency sweep is described in both U.S. Patent application 219,923 and U.S. Patent application 358,257 with respect to output circuit 20 of each of those applications. This frequency sweep leads to the ignition of lamps 21 and 23. The sweep starts in accordance with the signal applied to "F MIN" of control circuit 27 which signal is a derivative of the signal at terminal "V REG".

Should the lamps fail to ignite after a prescribed amount of sweep, excessive voltage could be applied to them. To prevent this, after the prescribed amount of sweep, a signal is applied along line 48 from output circuit 19 to signal applying circuit 29 which thereupon applies a signal to input "V LAMP" of control circuit 27. This signal causes the system to discharge capacitor 45 which is then charged again and the above described attempt to ignite the lamps is repeated.

Upon lamp ignition a signal is applied along line 48 from output circuit 19 to signal applying circuit 29 which thereupon provides a signal to input "C RECT" of control circuit 27. This signal causes the system to decrease the magnitude of the power being applied to lamps 21 and 23 and also to control the frequency of the voltage applied to the lamps by controlling the frequency of DC-AC converter circuit 17 in accordance with signals applied to output terminal "GHB".

After lamp ignition a lamp current signal is applied between lines 46 and 46A and ultimately to inputs LI1 and LI2 of control circuit 27 in order to cause the lamp current to remain constant.

The bottommost input terminal of control circuit 27 namely, "I PRIM", receives a signal along line 47 reflective of the current in the primary transformer of output circuit 19 (see FIG. 2 of the aforementioned Mark W. Fellows et al application Ser. No. 219,923 filed July 15, 1988). This signal is also used to control the frequency of DC-AC converter circuit 17 by applying proper gating signals at output terminal GHB of control circuit 27.

In addition, there is an input terminal on control circuit 27 identified by the term "D MAX". This terminal receives a signal from output terminal "V REG" of control circuit 27. In response to the signal it receives it causes control circuit 27 to vary the duty cycle of pre-conditioner circuit 15 by changing the signal applied along output terminal "GPC" from control circuit 27.

Also, a signal is received from pre-conditioner circuit 15 along line 50 to input terminal "OV" of control circuit 27 to control the operation of the boost converter in pre-conditioner circuit 15 during start-up. In response to this signal along line 50 control circuit 27 produces signals at its output terminal "GPC" which interrupts the operation of the converter when its output voltage exceeds a desired maximum. In this way it limits the voltage on the output of pre-conditioner circuit 15 during start-up.

The current output of pre-conditioner circuit 15 is also sensed during start-up to prevent dangerous current flow during that period. This signal is applied to input terminal "CSI" of control circuit 27 and prevents excessive current transients during start-up and operation. If excessive current is sensed, the duty cycle of pre-conditioner circuit 15 is decreased in accordance with signals produced by control circuit 27 through output "GPC".

Another output signal from pre-conditioner circuit 15 is applied to input terminal "DC" of control circuit 27, this signal operates to maintain the DC output voltage of pre-conditioner circuit 15 constant. It does this by controlling the duty cycle signals applied to pre-conditioner circuit 15 from output terminal "GPC" of control circuit 27.

Terminal "GND" of control circuit 27 as is obvious provides a ground for the control circuit. Terminal "PF" of control circuit 27 receives a signal representative of the rectified AC voltage fed to pre-conditioner circuit 15. In response to this signal control circuit 27 modifies the duty cycle of pre-conditioner circuit 15 by varying the output from terminal "GPC" of control circuit 27. This provides a desired power factor for pre-conditioner circuit 15. Terminal "DC OUT" of control circuit 27 is connected to capacitor 59 which serves as a noise filtering element.

Output terminal "CP" of control circuit 27 is connected to capacitor 210 which serves as a timing element. Terminal "CP" is connected to a current source (see FIG. 8 of the aforementioned Mark W. Fellows et al application Ser. No. 219,923 filed July 15, 1988). The output of this current source is compared in control circuit 27 with a prescribed signal applied to output terminal "DC OUT" and the voltage signal applied to terminal "D MAX". This comparison controls the signals applied through output terminal "GPC" for establishing the duty cycle of pre-conditioner circuit 15.

Terminal "CVCO" of control circuit 27 is connected to capacitor 130 which serves as a filtering element, as well as a timing element. Terminal "CVCO" is also connected in a feedback arrangement through a current source (see FIG. 8 of the aforementioned Mark W. Fellows et al application Ser. No. 219,923 filed July 15, 1989) to control the signals applied to output terminal "GHB" of control circuit 27. These signals control the duty cycle of DC-AC converter circuit 17.

The improvement disclosed herein involves the sensing of the voltage from input rectifier circuit 13. Power supply 11 can supply both an AC supply of a first frequency and a supply of a second frequency which could be DC. With a 60 cycle AC signal applied from power supply 11 to input rectifier circuit 13 the circuitry including capacitor C1, C2 and C3 in addition to resistors R1, R2 and R3 and diodes D1 and D2 (serving as a high pass filter) cause a high level signal to be applied at the junction point of capacitor C3 and resistor R2. This causes switch SW connected across circuit nodes CN1 and CN2 to close and substantially short circuit resistor R4 also connected across those nodes. From the teachings of application Ser. No. 358,257 it will be understood that with resistor R4 shorted signal applying circuit 29 causes control circuit 27 to cause output circuit 19 to light lamps 21 and 23 at their desired "fully lit" condition or rated lumens condition.

The following list identifies the primary function of each of the listed elements:

C1 and R1—specifically form the forementioned high pass filter

C2—acts as a high frequency noise filter

D1 and C3—D1 rectifies the output of the high pass filter and C3 stores this rectified signal which signifies the frequency of the output of the high pass filter R2,R3 and D2—prevent an excessive voltage from developing across switch SW Upon power supply 11 switching from a 60 cycle AC supply to a supply of a lower frequency (which could be a lower frequency AC signal or DC) such as might occur under emergency conditions, the high pass filter causes the voltage at the junction point between capacitor C3 and resistor R2 to change to a low level signal. This causes switch SW to open and inserts resistor R4 between lines 133 and 134 of signal applying circuit 29. As will be understood from application Ser. No. 358,257 the insertion of such a resistor between lines 133 and 134 causes signal applying circuit 29 to change the signal applied to input "C RECT" of control circuit 27. This causes control circuit 27 to effect the system in such a way as to operate lamps 21 and 23 at a dimmed condition substantially below their rated lumens condition. This dimmed condition can be controlled by selecting the size of resistor R4 as desired.

Switch S, it is to be understood, is shown schematically as a mechanical device. This was done for ease of illustration. Obviously, a semiconductive device could be used. Neither type switch forms any part of the invention itself.

It should be apparent that various modifications of the above will be evident to those skilled in the art and that the arrangement described herein is for illustrative purposes and is not to be considered restrictive.

What is claimed is:

1. A control system for a fluorescent lamp, including a single ballast means connected to said fluorescent lamp, said single ballast means being connectable either to an AC power supply of a first frequency or to a power supply of a second frequency, said fluorescent lamp being operated at substantially rated lumens condition when said AC power supply of said first frequency is applied to said single ballast means, and when said power supply of said second frequency is connected to said single ballast means said fluorescent lamp is operated in a dimmed condition at less lumens than its rated condition, said control system also including a switching means which is operated in a first state when said single ballast means is connected to said AC power supply of said first frequency an which is operated in a second state when said single ballast means is connected to said power supply of said second frequency and wherein said ballast means includes two circuit nodes and a resistor connected across said two circuit nodes, said switching means being connected in parallel with said resistor to provide a substantial short circuit across said resistor when said ballast means is connected to said AC power supply of said first frequency.

2. A control system according to claim 1, wherein said switching means is open across said resistor when said ballast means is connected to said power supply of said second frequency.

3. A control system for a fluorescent lamp, including a ballast means for said fluorescent lamp, said ballast means being connectable to an AC power supply of a first frequency or a power supply of a second frequency, said ballast means having two circuit nodes, said control system including a resistor and a switching means connected in parallel with said resistor, said switching means being connected across said two circuit nodes when said ballast means is connected to said AC power supply of said first frequency to provide a circuit in parallel with said resistor whereby said fluorescent lamp is operated at substantially its rated lumens condition and said switching means being open across said resistor when said ballast means is connected to said power supply of said second frequency whereby said ballast means dims said fluorescent lamp when said latter condition prevails so that said lamp is operated substantially below its rated lumens condition.

4. A control system for a fluorescent lamp according to claim 3, wherein said switching means provides a substantial short circuit across said resistor when said ballast means is connected to said AC power supply of said first frequency.

5. A control system for a fluorescent lamp according to claim 4, wherein said ballast means is a single one common to both said power supplies.

6. A control system for a fluorescent lamp according to any of claims 1, 2, 3, 4 or 5 wherein said power supply of said second frequency is a DC supply.

* * * * *